United States Patent [19]

Walsh

[11] 4,122,372
[45] Oct. 24, 1978

[54] DIELECTRICALLY LOADED WAVEGUIDE FOR PRODUCING HIGH POWER COHERENT MICROWAVE RADIATION

[75] Inventor: John E. Walsh, Bradford, Vt.

[73] Assignee: Dartmouth College, Hanover, N.H.; a part interest

[21] Appl. No.: 840,719

[22] Filed: Oct. 11, 1977

[51] Int. Cl.² ............................................. H01J 25/02
[52] U.S. Cl. ............................................ 315/5; 331/79
[58] Field of Search ..................... 315/4, 5, 3; 331/79

[56] References Cited
FOREIGN PATENT DOCUMENTS
782,573 9/1957 United Kingdom ...................... 315/5

Primary Examiner—Rudolph V. Rolinec
Assistant Examiner—Darwin R. Hostetter
Attorney, Agent, or Firm—Cushman, Darby & Cushman

[57] ABSTRACT

A method and apparatus for producing high power, coherent microwave radiaton in which a beam of high speed (above 0.5 light speed) electrons are propagated through a linear path in a waveguide tube including low dielectric constant material adjacent the path so that the electromagnetic radiation is slowed in the material and the beam coupled to the radiation. The beam is focussed and guided to destabilize the guided electro-magnetic modes and to convert the beam energy into high power, high frequency, coherent microwave radiation.

16 Claims, 12 Drawing Figures

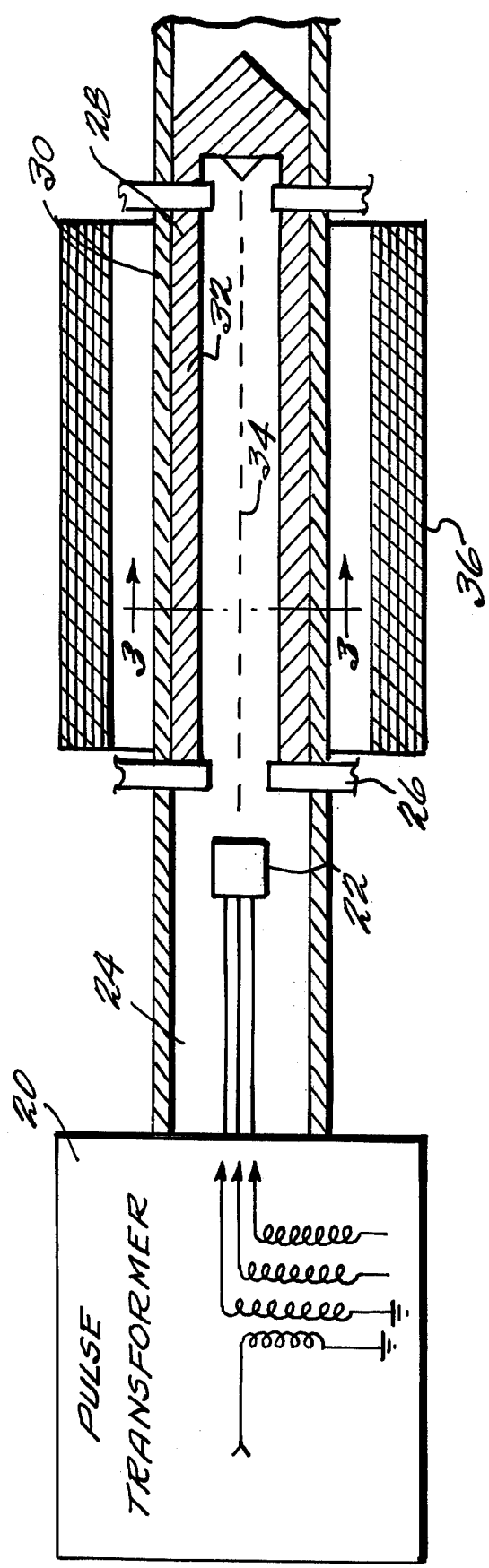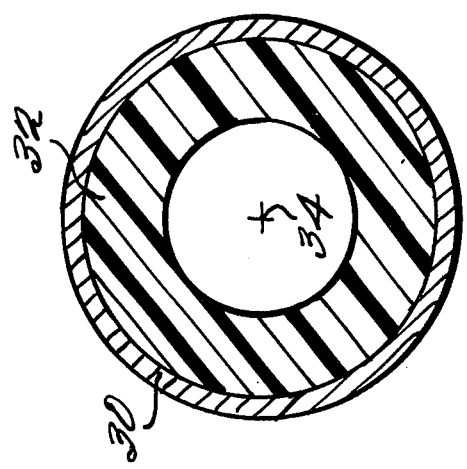
Fig. 1
Fig. 3 ns move. In
DIELECTRICALLY LOADED WAVEGUIDE FOR PRODUCING HIGH POWER COHERENT MICROWAVE RADIATION

BRIEF DESCRIPTION OF THE INVENTION BACKGROUND AND SUMMARY OF THE INVENTION

The invention relates to a method and device for producing coherent electromagnetic radiation.

A need exists for devices capable of producing substantial power levels of coherent radiation in the millimeter and sub-millimeter wavelength regions. Many high power microwave sources exist which utilize an electron beam as a source of free energy with a resonant structure to convert the electron beam free (kinetic) energy to oscillatory electromagnetic energy. High power devices producing radiation at long wavelengths are available. Low power devices producing radiation at short wavelengths are similarly available. However, devices are not available which are capable of producing substantial power levels at the short wavelengths in the above-mentioned regions.

In the past, proposals have been made to produce coherent microwave radiation by propagating electrons through a dielectrically loaded tube. In *Space Charge Waves*, by A. H. W. Beck (Pergamon Press, New York, 1958, p. 43), the possibility of such an apparatus is discussed, but dismissed as impractical because of the need for a relatively high dielectric constant material, which material produces poor coupling.

The present invention relates to a practical microwave device of this type which utilizes an electron beam as a source of free energy and a resonant structure for converting the kinetic energy to oscillatory electromagnetic energy. This device utilizes the well-known Cerenkov principle whereby radiation is produced when charged particles traverse a medium with a velocity exceeding the velocity of light in the medium. By utilizing very high speed electrons, at least greater than 0.5 light speed, and preferably greater than 0.8 light speed, the dielectric constant can be relatively low, e.g., 4 or less, so that much better coupling results than in the type of device discussed by Beck.

According to the present invention, a waveguide, preferably of cylindrical cross-section is loaded with a low-dielectric constant material adjacent to an interior path along which the electrons travel. The beam is focussed and guided to destabilize the transverse magnetic mode of the waveguide and to accordingly convert the electron beam energy into high power, high frequency, coherent microwave radiation.

In a first embodiment of the invention, the dielectric constant material has a cylindrical shape, an annular cross-section and surrounds a linear path through the center of the guide along which the electrons move. In a second embodiment, it is the path which is annular in cross-section, and the dielectric load is formed as an annular tube within the annular path and surrounding a central conductor. An electron source, such as a pulse transformer is mounted to supply a beam of electrons which passes along the interior path. Conventional structure is provided about the waveguide for focussing and guiding the beam, e.g., magnetic field coils. The wavelength is terminated in a conventional reflector when the structure is intended to operate as an oscillator, and with a conventional absorbing material when it is intended to operate as an amplifier.

In a further embodiment, a number of the waveguides are coupled together in close proximity to provide high total current capability in a structure whose characteristic transverse dimension is small enough to provide resonance in the sub-millimeter region of the electromagnetic spectrum.

Alternatively, solid dielectric rods can be bundled so that the electrons propagate along the interstices between the rods. Passages can be formed in an otherwise solid block of dielectric material to provide the small transverse dimensions required for producing radiation in the far infra-red spectrum.

In addition to providing substantial power levels, the embodiments of the present invention are voltage tunable and can be modulated. Since the speed of the beam electrons is near the speed of light, a low loss dielectric with a relative dielectric constant not too much greater than unity can be used as the dielectric material and to provide the needed wave slowing which produces the Cerenkov radiation. The power flowing in the dielectric-filled part of the waveguide will not be too much greater than that flowing in the beam filled part.

Other objects and purposes of the invention will be clear from the following detailed description of the invention.

BRIEF DESCRIPTION OF THE DRAWINGS

FIG. 1 shows a schematic view of one embodiment of the present invention formed as an oscillator;

FIG. 3 shows a sectional view through the waveguide along the lines 3—3 in FIG. 1;

DETAILED DESCRIPTION OF THE DRAWINGS

Figure 2:
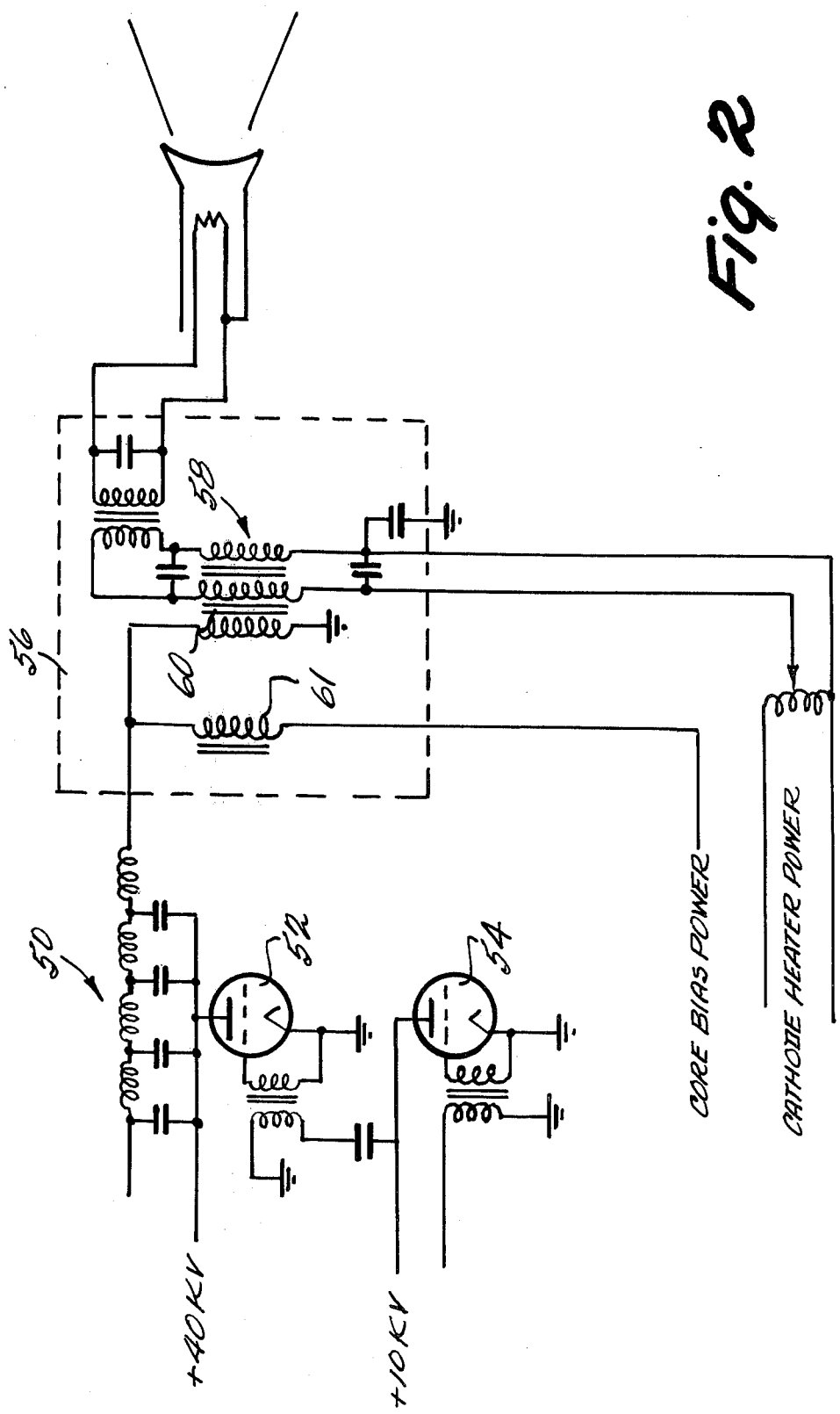
FIG. 2 shows a schematic view of the pulse transformer of the embodiment of FIG. 1.

Reference is now made to FIGS. 1–5 which illustrate a first embodiment of the present invention. According to the embodiments of the present invention as described briefly above, high energy electrons having a speed at least greater than 0.5 light speed, and preferably greater than 0.8 light speed, are propagated along a linear path in a wavelength having dielectric material adjacent the path. The electro-magnetic radiation propagating through the dielectric material is slowed by the material and is thereby coupled to the electron beam. The coherent high frequency electro-magnetic radiation thus produced can be removed from the waveguide structure by any suitable mechanism. The electron beam within the waveguide is guided and focussed by conventional techniques, e.g., magnetic field coils.

The high energy electron beam can be produced by any suitable means. In the embodiment of FIGS. 1-5, pulse transformer 20 may be a conventional pulse transformer, e.g., a pulse transformer available from Pearson Electronics Co. The transformer is immersed in oil and the output thereof is connected to a cathode 22 by a transmission line 24 which is pressurized with $SF_6$. $SF_6$ can also be used in place of oil in the pulse transformer. Cathode 22 is in a vacuum and produces a beam of high energy electrons. The configuration is such as to conventionally minimize the chances of the electrons directly hitting the anode 26.

The electron beam passes into the waveguide tube 28 which is comprised as best seen in FIG. 3 of a metal waveguide wall 30 surrounding an annular cylinder of dielectric material 32. The electrons propagate along an axis 34 of a path within dielectric material 32. Conventional magnetic field coils 36 about the waveguide conventionally focus and guide the electrons as they move along axis 34. The dielectric loaded guide acts as a slow wave structure, bunches the beam and thereby serves to extract energy from the drifting electrons.

The operating frequency of the device is, of course, determined by the transverse dimension of the waveguide, the filling factor and the beam velocity. Standard waveguide design technique can be used to choose the operating wavelength anywhere between 3cm and 3mm. Operation outside of this range is feasible, but other configurations as described below may be more effective for such wavelengths.

FIG. 2 illustrates one detailed embodiment of the pulse generator. The pulse generator includes a pulse forming network generally indicated as 50 and a pair of thyratrons 52 and 54 which are triggered by a suitable conventional pulse generator or other structure. The pulse forming network is connected to the transformer tank 56 which, as noted above, is filled with oil or other fluid. The transformer includes a bifilar winding 58 on the main transformer 60, and the cathode faces an anode which is preferably at ground potential. The bias choke 61 improves the pulse characteristics produced by the transformer.

Figure 4:
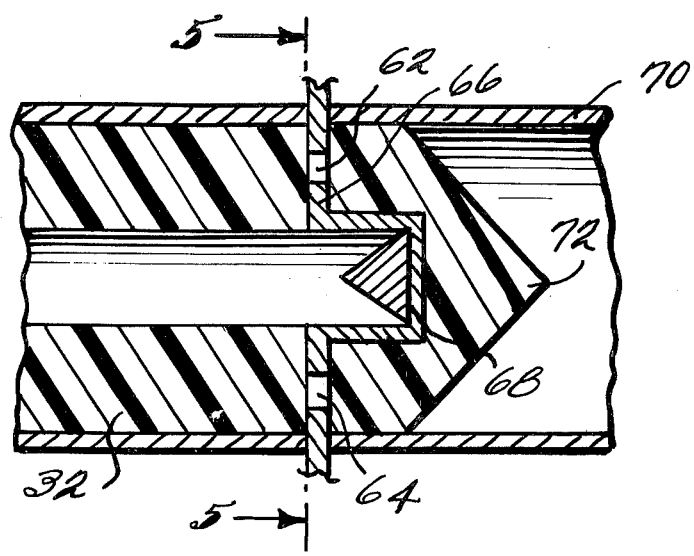
FIG. 4 shows a detailed view of the waveguide termination.
Figure 5:
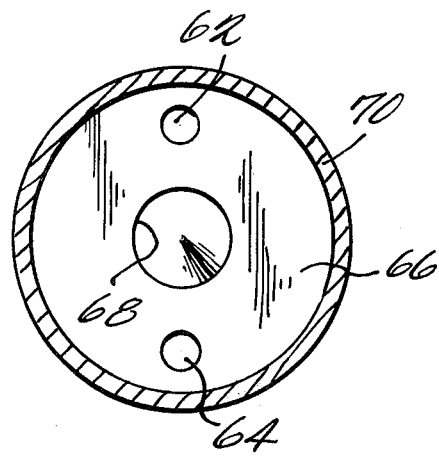
FIG. 5 shows a sectional view along the lines 5—5 in FIG. 4.

FIGS. 4 and 5 show in detail one way in which the electromagnetic radiation can be coupled out of the resonating structure of the waveguide. As shown in FIG. 5 two slots 62 and 64 are provided in a reflecting plate 66 which directly contacts the annular dielectric material 32 and which causes the device to function as an oscillator. The size and number of coupling holes which is desirable is determined by the gain of the resonator and for high gain structures, plate 66 may be unnecessary. A conventional Faraday cup 68 provides a beam dump, and the output of the resonator is matched to that of the output waveguide 70, by a dielectric matching section 72. Section 72 is preferably of the same material as dielectric material 32. The matching section 72 in the embodiment of FIGS. 1-5 has a conical shape in order to minimize perturbations introduced by Faraday cup 68. The structure for coupling out the electro-magnetic radiation illustrated in FIGS. 4 and 5 is conventional microwave technology.

Figure 6:
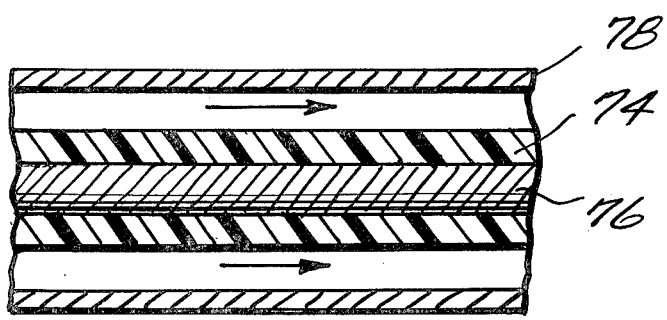
FIG. 6 shows a partial and schematic view of a second embodiment of the present invention.
Figure 7:
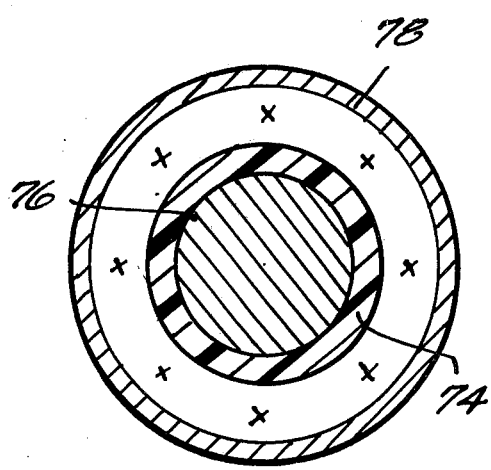
FIG. 7 shows a sectional view of the embodiment of FIG. 6 alont the lines 7—7 in FIG. 6.

Reference is now made to FIGS. 6 and 7 which illustrate a second and further embodiment of the present invention. In the arrangement of FIGS. 6 and 7, the dielectric material 74, is formed as an annular cylinder about an inner metal rod 76. The electrons propagate along an annular path about the dielectric material and between the dielectric ring material and an outer metal cylinder 78. The embodiment of FIGS. 6 and 7 is particularly advantageous when high currents are to be propagated, since it is easier to propagate an electron beam near a metal wall than a dielectric material because of the absence of static charge build-up on the metal cylinder.

Figure 8:
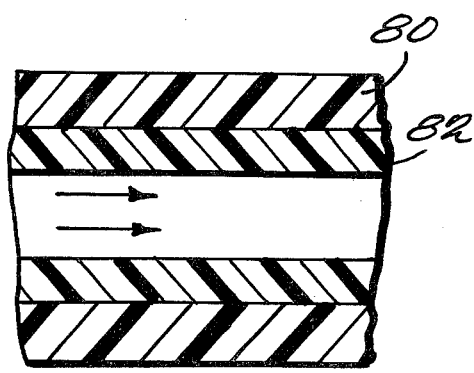
FIG. 8 shows a third embodiment in which the metal waveguide wall is replaced by a dielectric.

FIG. 8 illustrates a further embodiment of the invention in which the outer metal cylinder is replaced by a dielectric cylinder or ring 80, outside the dielectric material 82 which couples the electro-magnetic radiation to the electron beam. The ring 80 has a lower dielectric constant than material 82 to cause reflection at the boundary. Substituting the dielectric material 80 for metal may improve the spectral qualities of the radiation since the structure is open at the side. Particularly at short wavelengths, it is easier to find a suitable low loss dielectric than a satisfactory conductor.

Figure 9:
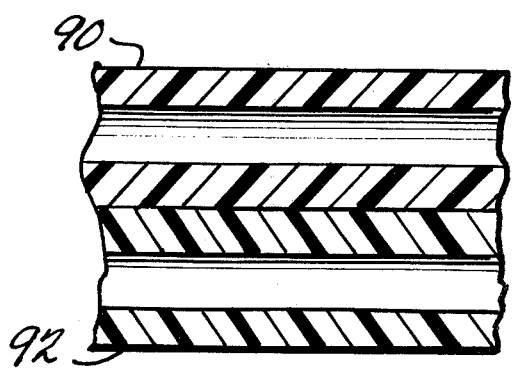
FIGS. 9 and 9A show a further embodiment in which a plurality of waveguide tubes are coupled together in a bundle.
Figure 9A:
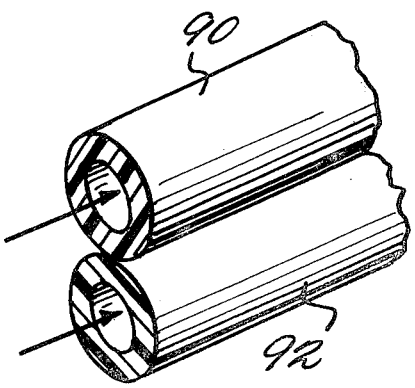

FIGS. 9 and 9A illustrate a further embodiment of the invention in which at least two and generally more dielectric tubes extend in proximity in a bundle so that none of the individual tubes is required to carry more than a certain current, while the total current can be relatively high. Particularly at small wavelengths, the transverse dimension of each individual tube must be quite small and its individual current carrying capacity therefore may be limited. In the arrangement of FIGS. 9 and 9A two tubes 90 and 92 are shown and will be understood that as many tubes as desired can be bundled.

Figure 10:
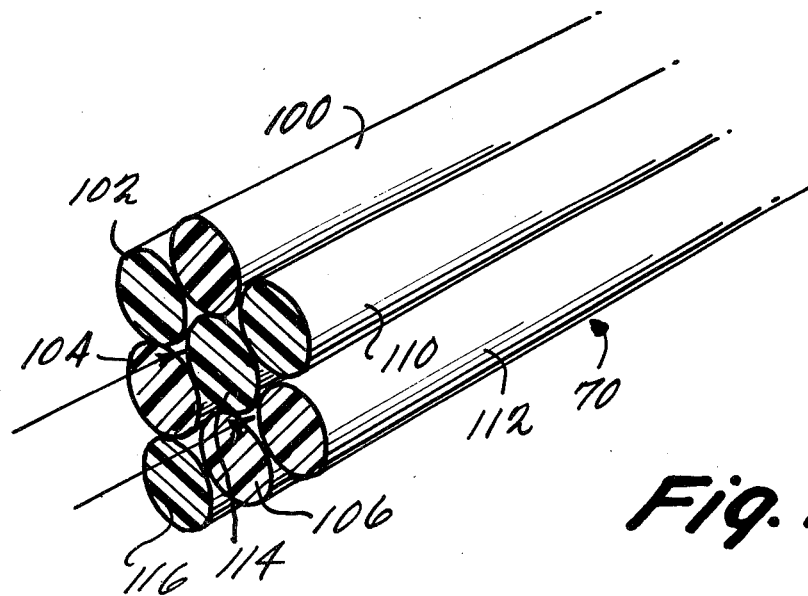
FIG. 10 shows a further embodiment with a number of solid dielectric waveguides in a bundle.

FIG. 10 shows an embodiment which is similar to that of FIG. 9. However, rather than a number of tubes having a central axis along which the beam propagates, in the arrangement of FIG. 10 a plurality of solid dielectric rods extend in proximity in a bundle and the electron beam propagates along the interstices between the cylindrical rods. In the arrangement of FIG. 10, rods 100, 102, 104, 106, 110, 112, 114, and 116 are shown constituting a bundle.

Figure 11:
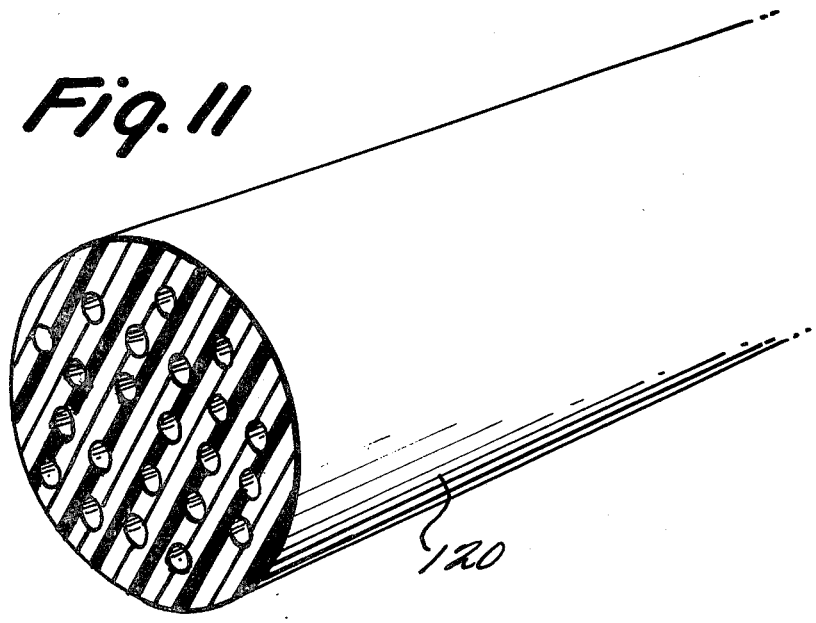
FIG. 11 shows a further embodiment with a block of dielectric material having small holes therethough, defining electron beam passages.

FIG. 11 shows another embodiment of the invention which finds particular utility at very small wavelengths where the transverse dimension must be reduced to very small values, i.e., millimeters or fractions thereof. In order to provide such small transverse dimension paths, a unitary block of suitable dielectric material 120 is provided as shown with a multiplicity of linear paths extending therethrough. The width of the paths is enlarged in FIG. 11 for illustration. These linear paths can be formed by molding.

With regard to the embodiments of FIGS. 9-11, the small passages can be easily driven by means of a brushlike cathode with small protuberances which fit each of the small individual passageways.

Any suitable materials can be used for the dielectric materials in order to provide whatever slowing is desired for any given device. Examples of suitable dielectrics include: quartz; polytetrafluoroethylene; polyethylene; polymethyl methacrylate, sold under the trademark LUCITE; and polystyrene which finds particular utility in the infra-red spectrum. A wide range of suitable materials having any given desired index of refraction is generally available commercially.

Many changes and modifications of the above-desired embodiments can be carried out without departing from the scope of the invention. That scope, therefore, is intended to be limited only by the scope of the appended claims.

What is claimed is:

1. A device for producing high power, coherent radiation comprising:
   a source of a beam of electrons having a speed greater than 0.5 light speed;
   a waveguide tube having an internal path along which electrons travel, said waveguide tube including low dielectric constant material having a dielectric constant of four or less adjacent said path, electromagnetic radiation propagating in said material and being slowed by said dielectric material for coupling said beam to said electro-magnetic radiation; and
   means for focussing and guideing said beam to destabilize the guided electro-magnetic modes, and to convert the electron beam energy into high power, millimeter wavelength, coherent radiation.

2. A device as in claim 1, wherein said source is a pulse transformer.

3. A device as in claim 1, wherein said waveguide tube includes a metal waveguide wall and said dielectric material is formed as an annular tube within said wall having a central passage along which said electrons propagate.

4. A device as in claim 1, wherein said waveguide tube includes a metal waveguide wall and said dielectric material is a cylinder within said wall with an annular passage between said wall and dielectric material along which said electrons propagate.

5. A device as in claim 1, including a plurality of said waveguide tubes extending in proximity to each other in a bundle.

6. A device as in claim 1, wherein said waveguide tube is a block of dielectric material having a plurality of passages therethrough along which electron beams propagate.

7. A device as in claim 1, wherein said tube comprises a plurality of rods of dielectric material in a bundle, the interstices between said rods forming passages along which electron beams propagate.

8. A device as in claim 1, including means for coupling said electromagnetic radiation from said dielectric material.

9. A device as in claim 8, wherein said coupling means includes a reflector for causing oscillation of said radiation.

10. A device as in claim 9, wherein said reflector is a plate having a plurality of slots therein.

11. A device as in claim 1, wherein said waveguide tube includes a second dielectric material formed about the dielectric material slowing the electromagnetic radiation, the second dielectric material having a lower dielectric constant.

12. A device as in claim 1, wherein said electrons have a speed greater than 0.8 light speed.

13. A device as in claim 1, wherein said dielectric material is chosen from the group consisting essentially of quartz, polytetrafluoroethylene, polymethyl methacrylate, polyethylene, and polystyrene.

14. A method of producing high power, coherent radiation comprising the steps of:
    propagating a beam of electrons having a speed greater than 0.5 light speed through a passage in a waveguide tube having a dielectric material with a dielectric constant of four or less adjacent said passage so that the electromagnetic radiation is slowed by said material to couple said beam to said radiation; and
    focussing and guiding said beam to destabilize the guided electromagnetic modes, and to convert the electron beam energy into high power, millimeter wavelength coherent radiation.

15. A device as in claim 1 wherein said tube defines a plurality of paths extending in proximitity to each other in a bundle.

16. A device as in claim 1 wherein said focussing and guiding means include magnetic field coils.

* * * * *